Patented Sept. 5, 1922.

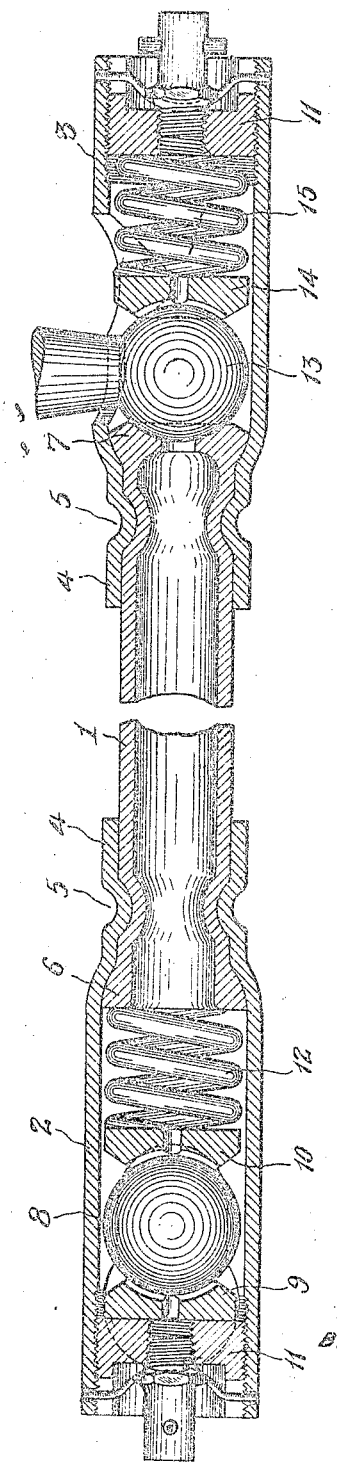

1,428,024

UNITED STATES PATENT OFFICE.

HARRY B. GARMAN, OF DETROIT, MICHIGAN, ASSIGNOR TO THE STEEL PRODUCTS COMPANY, OF CLEVELAND, OHIO, A CORPORATION OF OHIO.

DRAG LINK.

Application filed December 30, 1921. Serial No. 525,878.

*To all whom it may concern:*

Be it known that I, HARRY B. GARMAN, a citizen of the United States, resident of Detroit, county of Wayne, and State of Michigan, have invented new and useful Improvements in Drag Links, of which the following is a specification, the principle of the invention being herein explained and the best mode in which I have contemplated applying that principle, so as to distinguish it from other inventions.

This invention relates to drag links for use as a part of the steering mechanism of automobiles and more particularly to the connection of the enlarged end sockets to the central body portion of the link.

It is an object of this invention to provide a joint between the end sockets and the central body portion of the link which permits quick assembly and interlocking of the parts in forming a permanent connection between them.

A further object is to so form the ends of the body member within the socket as to provide an abutment or bearing surface.

The annexed drawings and the following description set forth in detail certain means embodying my invention, the disclosed means, however, constituting but one of the various mechanical forms in which the principle of the invention may be employed.

In said annexed drawing the improved link is shown in longitudinal section. The link consists of a central tubular central body portion 1 and end socket members 2 and 3 of enlarged diameter. The socket members 2 and 3 have restricted inner end portions 4 which fit over the tubular central body portion 1. To unite the socket member to the tubular body portion 1 a circumferential indentation 5 is formed in the interfitting portions of the socket and body members. The end of the tubular member 1 within the socket 2 is upset to fit the interior of the enlarged portion of the socket and at the same time to form a thickened abutment 6. The end of the tubular member 1 within the socket member 3 is upset to fit the interior of the socket member and to thicken and force inwardly the metal of the wall thereof to form a bearing portion 7 having a concave bearing face.

The ball end 8 of the steering arm is seated within the socket member 2 between bearing blocks 9 and 10. The bearing block 9 is seated against the end closure plug 11 and the bearing block 10 is yieldingly pressed against the opposite face of the ball 8 by means of a spring 12 interposed between the rear face thereof and the abutment 6.

The ball end 13 of the axle arm is seated within the socket member 3 between the concave face in the end portion 7 of the body member 1 and a bearing block 14. The bearing block 14 is yieldingly pressed against the ball 13, and the ball 13 against the bearing portion 7 of the body member 1, by means of a spring 15 interposed between the end plug 11 of the socket member 3 and the rear face of the block 14.

Having described my invention, what I claim and desire to secure by Letters Patent is:—

1. A drag link, comprising a body member consisting of a section of metal tubing; and a tubular end socket member of larger diameter than said body portion, said socket member having a restricted tubular end portion adapted to fit over the tubular body member, the end of said body member within the socket member being upset to form a thickened wall of enlarged diameter fitting within the enlarged portion of the socket member, said thickened wall forming an abutment adjacent the inner end of said socket member.

2. A drag link, comprising a body member consisting of a section of metal tubing; and a tubular end socket member of larger diameter than said body member, said socket member having a restricted tubular end portion adapted to fit over the tubular body member and an internal shoulder, interfitting circumferential grooves in said tubular body member and the restricted portion of said socket member, the end of said body member within the socket member being upset to fit within the enlarged portion of said socket member and against said internal shoulder.

3. A drag link, comprising a body member; and a tubular end socket of larger diameter than said body member, said socket member having a restricted tubular end portion adapted to fit over said body member, the end of said body member within said socket member being enlarged to fit the enlarged portion thereof and having a concave end face forming a bearing surface.

4. A drag link, comprising a body member consisting of a section of metal tubing; and a tubular end socket member of larger diameter than said body member, said socket member having a restricted tubular end portion adapted to fit over said body member, the end of said body member being upset within the enlarged portion of said socket member to enlarge the same and thicken the wall thereof, the said upset thickened end of said tubular body member being formed to provide a concave bearing face.

Signed by me this 16th day of December, 1921.

HARRY B. GARMAN.